United States Patent
Li et al.

(10) Patent No.: US 12,045,780 B2
(45) Date of Patent: Jul. 23, 2024

(54) ONLINE INTERVIEW METHOD AND SYSTEM

(71) Applicant: GUANGZHOU QUICK DECISION INFORMATION TECHNOLOGY CO., LTD., Guangzhou (CN)

(72) Inventors: Shaohui Li, Guangzhou (CN); Zhenbang Liu, Guangzhou (CN); Yutao Zou, Guangzhou (CN)

(73) Assignee: GUANGZHOU QUICK DECISION IINFORMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/605,181

(22) PCT Filed: Mar. 10, 2021

(86) PCT No.: PCT/CN2021/079860
§ 371 (c)(1),
(2) Date: Oct. 20, 2021

(87) PCT Pub. No.: WO2022/001161
PCT Pub. Date: Jan. 6, 2022

(65) Prior Publication Data
US 2023/0222449 A1   Jul. 13, 2023

(30) Foreign Application Priority Data
Jun. 29, 2020  (CN) .......................... 202010603217.7

(51) Int. Cl.
*G06Q 10/1053* (2023.01)
*G10L 15/04* (2013.01)
(Continued)

(52) U.S. Cl.
CPC .......... *G06Q 10/1053* (2013.01); *G10L 15/04* (2013.01); *G10L 15/22* (2013.01);
(Continued)

(58) Field of Classification Search
CPC ..... G06Q 10/1053; G10L 15/04; G10L 15/22; G10L 15/26; G10L 15/30; G10L 25/57;
(Continued)

(56) References Cited

U.S. PATENT DOCUMENTS 8,337,208 B1 * 12/2012 Thirumalainambi .. G06Q 10/10
705/7.42
8,856,000 B1 * 10/2014 Larsen .................. G06F 40/253
704/255
(Continued)

FOREIGN PATENT DOCUMENTS

CN           101291239 A      10/2008
CN           105577960 A       5/2016
(Continued)

OTHER PUBLICATIONS

Search Report issued in European Patent Application No. 21794295. 2; Application Filing Date Mar. 10, 2021; Date of Mailing Jul. 4, 2023 (7 pages).

*Primary Examiner* — Florian M Zeender
*Assistant Examiner* — Karma A El-Chanti
(74) *Attorney, Agent, or Firm* — CANTOR COLBURN LLP

(57) ABSTRACT

One or more embodiments of the present specification relates to an online interview method and system. The method includes: establishing communication connection between an interviewing terminal and an interviewed terminal through a network; and acquiring communication information between the interviewing terminal and the interviewed terminal. The communication information includes one or more types of audio information, video information, and text information. The interviewing terminal includes one or more of a first host terminal, a second host terminal, and a text processing terminal. The first host terminal is configured to host an interview, and the first host terminal (Continued)

displays an interview outline and/or information of the interviewed terminal. The second host terminal is configured to host the interview and/or participate in the consultation of interview questions. The text processing terminal converts the audio information and/or the audio information in the video into corresponding text information.

15 Claims, 3 Drawing Sheets

(51) Int. Cl.
| | | |
|---|---|---|
| *G10L 15/22* | (2006.01) | |
| *G10L 15/26* | (2006.01) | |
| *G10L 15/30* | (2013.01) | |
| *G10L 25/57* | (2013.01) | |
| *G10L 25/63* | (2013.01) | |
| *H04L 65/1069* | (2022.01) | |
| *H04L 65/1096* | (2022.01) | |
| *H04L 65/80* | (2022.01) | |
| *H04M 3/42* | (2006.01) | |
| *H04M 3/56* | (2006.01) | |

(52) U.S. Cl.
CPC .............. *G10L 15/26* (2013.01); *G10L 15/30* (2013.01); *G10L 25/57* (2013.01); *G10L 25/63* (2013.01); *H04L 65/1069* (2013.01); *H04L 65/1096* (2013.01); *H04L 65/80* (2013.01); *H04M 3/42221* (2013.01); *H04M 3/563* (2013.01); *H04M 3/567* (2013.01)

(58) Field of Classification Search
CPC ..... G10L 25/63; G10L 13/08; H04L 65/1069; H04L 65/1096; H04L 65/80; H04M 3/42221; H04M 3/563; H04M 3/567; G06F 40/30; G06F 16/353; G06F 40/284; G06F 40/289; G06N 20/00; H04N 7/147; H04N 7/155; H04N 7/141
See application file for complete search history.

(56) References Cited

U.S. PATENT DOCUMENTS

| | | | | |
|---|---|---|---|---|
| 10,896,688 | B2* | 1/2021 | Vaculin | G06N 5/00 |
| 11,050,807 | B1* | 6/2021 | Palmer | G10L 15/26 |
| 11,483,170 | B1* | 10/2022 | Carbune | H04L 12/1822 |
| 11,810,357 | B2* | 11/2023 | Reece | G06F 40/284 |
| 2006/0109786 | A1* | 5/2006 | Abdel-Kader | H04L 65/80 |
| | | | | 370/232 |
| 2009/0037201 | A1 | 2/2009 | Cravens | |
| 2013/0109414 | A1 | 5/2013 | Miyazaki | |
| 2013/0226578 | A1 | 8/2013 | Bolton et al. | |
| 2015/0269529 | A1* | 9/2015 | Kyllonen | G06Q 10/1053 |
| | | | | 705/321 |
| 2015/0286858 | A1* | 10/2015 | Shaburov | H04N 7/147 |
| | | | | 382/103 |
| 2018/0150739 | A1* | 5/2018 | Wu | G06N 20/10 |
| 2019/0019160 | A1* | 1/2019 | Champaneria | G06N 5/04 |
| 2019/0266912 | A1* | 8/2019 | Barzman | G09B 7/00 |
| 2019/0332666 | A1* | 10/2019 | Dadachev | G06F 40/284 |
| 2019/0370412 | A1* | 12/2019 | Hammontree | G06F 16/90332 |
| 2020/0311682 | A1* | 10/2020 | Olshansky | G10L 15/26 |
| 2020/0358900 | A1* | 11/2020 | Carty | H04N 7/147 |
| 2021/0067478 | A1* | 3/2021 | Li | H04L 43/16 |
| 2021/0264921 | A1* | 8/2021 | Reece | G06F 40/169 |
| 2021/0312399 | A1* | 10/2021 | Asokan | G10L 15/063 |
| 2021/0406316 | A1* | 12/2021 | Buckley | G06N 20/00 |
| 2022/0076211 | A1* | 3/2022 | Yoo | G06Q 10/0639 |

FOREIGN PATENT DOCUMENTS

| | | |
|---|---|---|
| CN | 108124061 A | 6/2018 |
| CN | 109302576 A | 2/2019 |
| CN | 109918650 A | 6/2019 |
| CN | 110297907 A | 10/2019 |
| CN | 110457424 A | 11/2019 |
| CN | 110689357 A | 1/2020 |
| CN | 110853646 A | 2/2020 |
| CN | 111192571 A | 5/2020 |
| CN | 111818290 A | 10/2020 |

\* cited by examiner

ONLINE INTERVIEW METHOD AND SYSTEM

CROSS REFERENCE TO THE RELATED APPLICATIONS

This application is the national phase entry of International Application No. PCT/CN2021/079860, filed on Mar. 10, 2021, which is based upon and claims priority to Chinese Patent Application No. 202010603217.7, filed on Jun. 29, 2020, the entire contents of which are incorporated herein by reference.

TECHNICAL FIELD

The present application relates to the field of communications, and in particular, to an online interview method and system.

BACKGROUND

In recent years, telecommuting and cross regional cooperation have developed rapidly in enterprises due to economic globalization. Meanwhile, the widespread popularity of products, such as video cameras and cameras, at electronic office terminals has made great development in new conference modes, such as video conferences and online interviews. However, although there are the conference modes, such as the video conferences and the online interviews, it still needs the intervention of manual auxiliary operation in an actual process of a conference, which reduces the user experience during the use of the video conferences.

Therefore, it is necessary to provide an online interview system to improve the user experience of the online interviews.

SUMMARY

One of the embodiments of the present application provides an online interview method. The method may include the following operations. Communication connection may be established between an interviewing terminal and an interviewed terminal through a network. Communication information between the interviewing terminal and the interviewed terminal may be acquired. The communication information may include one or more types of audio information, video information, and text information. The interviewing terminal may include one or more of a first host terminal, a second host terminal, and a text processing terminal. The first host terminal may be configured to host an interview, and the first host terminal may display an interview outline and/or information of the interviewed terminal. The second host terminal may be configured to host the interview and/or participate in the consultation of interview questions. The text processing terminal may convert the audio information and/or the audio information in the video into corresponding text information.

One of the embodiments of the present application provides an online interview system. The system may include a communication connection establishment module and an information acquisition module. The communication connection establishment module may be configured to establish communication between an interviewing terminal and an interviewed terminal through a network. The information acquisition module may be configured to acquire communication information between the interviewing terminal and the interviewed terminal. The communication information may include one or more types of audio information, video information, and text information. The interviewing terminal may include one or more of a first host terminal, a second host terminal, and a text processing terminal. The first host terminal may be configured to host an interview, and the first host terminal displays an interview outline and/or information of the interviewed terminal. The second host terminal may be configured to host the interview and/or participate in the consultation of interview questions. The text processing terminal may convert the audio information and/or the audio information in the video into corresponding text information based on a machine learning model.

One of the embodiments of the present application provides an online interview apparatus. The apparatus includes at least one processor and at least one memory. The at least one memory is configured to store computer instructions. The at least one processor is configured to execute at least part instructions of the computer instructions to implement the online interview method.

One of the embodiments of the present application provides a computer readable storage medium. The computer readable storage medium stores computer instructions. The online interview method is executed by a computer after the computer instructions in the computer readable storage medium are executed.

BRIEF DESCRIPTION OF THE DRAWINGS

The present application will further be described with exemplary embodiments. These exemplary embodiments will be described in detail through the drawings. These embodiments are unrestrictive. In these embodiments, the same numbers represent the same structures.

DETAILED DESCRIPTION OF THE EMBODIMENTS

Figure 1:
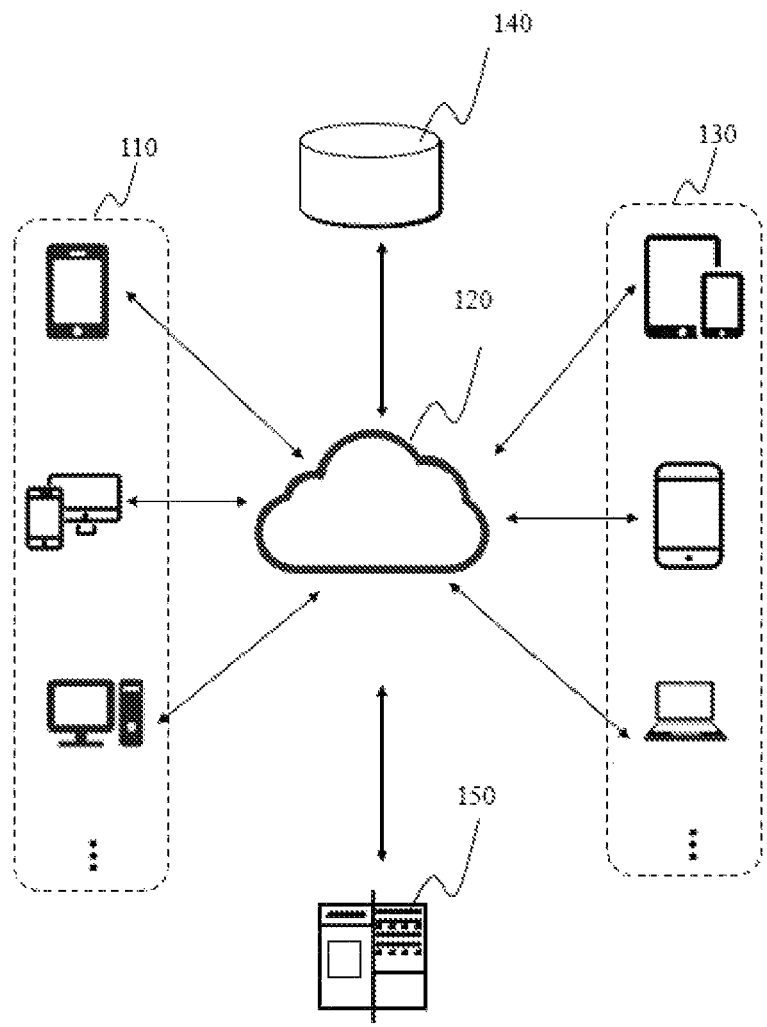
FIG. 1 is a schematic diagram of an application scenario of an online interview system shown according to some embodiments of the present application.

To describe technical solutions in embodiments of the present application more clearly, the following briefly describes the accompanying drawings required for describing the embodiments. It is apparent that the accompanying drawings in the following description are only some examples or embodiments of the present application. Those skilled in the art can also apply the present application to other similar situations according to the these accompanying drawings without any creative work. Unless apparent from the language environment or otherwise stated, the same reference signs in the drawings represent the same structures or operations.

It should be understood that "system", "apparatus", "unit", and/or "module" used herein are/is methods/a method used to distinguish different components, elements, parts, portions, or assemblies of different levels. However, if other terms may achieve the same purpose, these terms may be replaced with other expressions.

As shown in the present application and the claims, terms such as "a/an", "one", "a kind of", and "the" do not refer in particular to a singular form but may also include a plural form, unless exceptional cases are clearly indicated in the context. In general, terms "include" and "contain" only indicate inclusion of steps and elements that are clearly identified, these steps and elements do not form an exclusive enumeration, and a method or a device may also include other steps or elements.

In the present application, the flowchart is used to describe operations executed by a system according to the embodiments of the present application. It should be understood that previous or subsequent operations are not always executed accurately in sequence. Instead, each step may be processed in an inverted sequence or at the same time. In addition, other operations may also be added to these processes, or one or more operations may be removed from these processes.

Telecommuting and cross regional cooperation has developed rapidly to adapt to the development of economic globalization. The forms of online conferences, remote video conferences, etc. are very popular in modern enterprises. However, although there are the conference modes, such as the video conferences and the online interviews, it is difficult to combine an actual process of a conference with a process of the conference/interview. So, it often needs a large amount of manual auxiliary operation during the process of an online conference/interview.

In some embodiments, the processes of the online interview/video conference and the like need one or more special recorders to record speech of speakers throughout the process, so as to form a conference summary after the conference is ended to record a conference process. However, when there are many speakers or the speaking duration is very long, the artificially recorded viewpoints and contents are often biased or missing.

In some embodiments, when there are many speakers, an interviewer needs to match each speaker with his corresponding main viewpoint. The process also needs manual assistance to avoid matching a viewpoint of a speaker with a plurality of speakers by mistake.

In some embodiments, during an online interviewing process, a questioner needs to record drafted questions on paper or other carriers, and a question asking process of the questioner is based on a question list prepared in advance. When the questioner needs to ask a deeper question about a certain question or a certain type of questions, the questioner needs to think about a core viewpoint of the type of questions in a short time and ask further questions based on the core viewpoint.

In view of the above problems, in some embodiments, video/audio produced in a conference process may be processed by using a processing device. Text information of speech contents during the conference process is obtained in the modes of converting speech into text and the like, so as to form a conference summary, and avoid the basis of manual record or manual assistance.

In some embodiments, viewpoint information in each speech content can be obtained based on the speech content converted into text and based on the methods, such as machine learning. The main viewpoint of each speaker can be acquired quickly by extracting the viewpoint information, which avoids missing or matching the main viewpoint of each speaker by mistake.

In some embodiments, the question list for a questioner to ask questions may be updated in real time, which avoids that the questioner needs to deeply understand and ask questions about the content of the speech during an interview. In some embodiments, the question list may be updated by others based on the main viewpoint of the speaker. In another some embodiments, the question list may also be a preset question list given based on the viewpoint of the speaker.

FIG. 1 is a schematic diagram of an application scenario of an online interview system shown according to some embodiments of the present application.

As shown in FIG. 1, the application scenario may include an interviewing terminal 110, a network 120, an interviewed terminal 130, a storage device 140, and a processor 150.

At the online interview system 100, the interviewer interviews an interviewee online through the network, which promotes convenient transmission of viewpoints supported by users and real-time communication of opinions of users.

The interviewing terminal 110 may be one or more terminals used by interviewers, and the interviewed terminal 130 may be one or more terminals used by interviewees.

Figure 2:
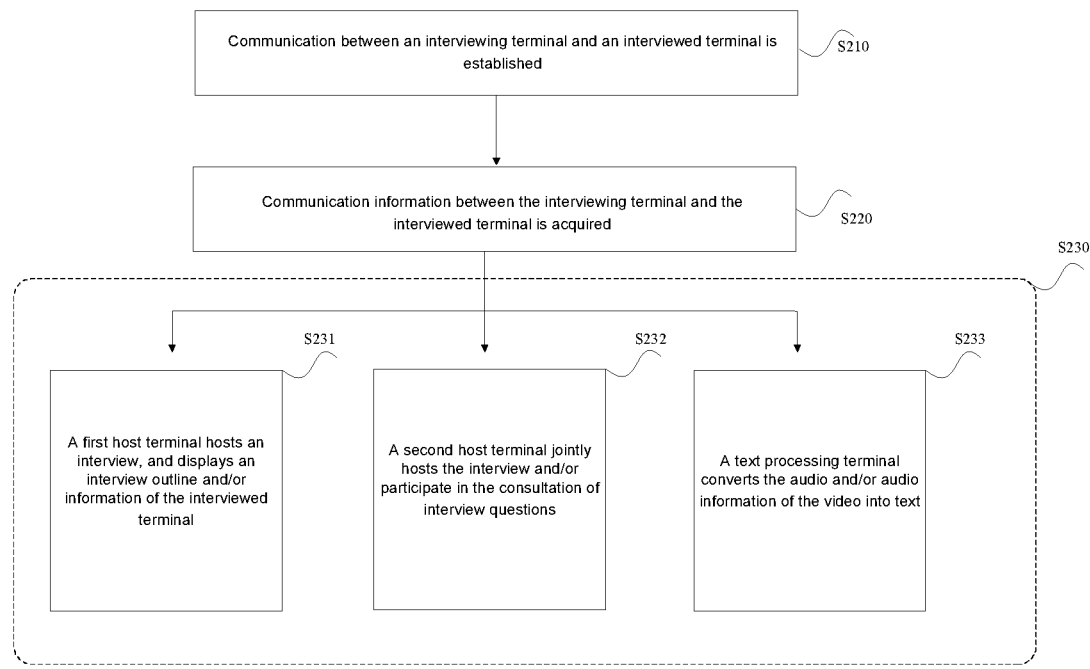
FIG. 2 is an exemplary flowchart of an online interview method shown according to some embodiments of the present application.

The interviewing terminal 110 may include a plurality of types, and specific description can refer to the description of FIG. 2.

In some embodiments, both the interviewing terminal 110 and the interviewed terminal 130 may consist of electronic devices. The electronic device may include, but are not limited to, one or more of a mobile device, a tablet computer, a laptop computer, a desktop computer, etc. In some embodiments, the electronic devices may be mobile devices and computer devices with operation systems of Android, iOS, Windows, etc. The present description does not limit the number and type of electronic devices included in the interviewing terminal 110 and the interviewed terminal 130.

In some embodiments, the interviewing terminal 110 and the interviewed terminal 130 may include a telephone, or other devices that can perform information communicating.

In some embodiments, a user side that needs to host the interview may give an interview through the interviewing terminal 110, and the user side that accepts an interview may accept the interview through the interviewed terminal 130. The interviewing terminal 110 and the interviewed terminal 130 may receive the communication information input by a user, including one or more types of information, such as audio information, video information, and text information. The input modes includes audio and video input, manual text input, uploading documents, and other modes. The communication information may be feed back to one side or two sides of the interviewing terminal 110 and the interviewed terminal 130, so as to realize data interaction.

Connection and communication may be performed between interviewing terminals 110, between interviewed terminals 130, and between the interviewing terminals 110 and the interviewed terminals 130 through a network 120. The network among various parts in the system nay be any one or more of a wired network or a wireless network. For example, the network 120 may include the Internet, a Local Area Network (LAN), a Wide Area Network (WAN), a Wireless Local Area Network (WLAN), a Public Switched Telephone Network (PSTN), cable connection, etc. or any combination thereof. The network between every two parts may use one of the above modes or a variety of the modes.

In some embodiments, the application scenario may further include a processor 150. The processor 150 may process the data and/or information obtained from other devices or system components. Data refers to digital representation of information, which may include various types, such as binary data, text data, image data, video data, etc. The processor may execute program instructions based on these data, information, and/or processing results, so as to execute one or more functions described in the present application.

The instructions refer to programs that may control device or components to execute specific functions.

In some embodiments, the processor 150 may include one or more sub-processing devices (for example, a single-kernel processing device or a multi-kernel and multi-core processing device). As an example only, the processor 150 may include a Central Processing Unit (CPU), an Application Specific Integrated Circuit (ASIC), an Application Specific Instruction Set Processor (ASIP), a Graphics Processor (GPU), a Physical Processor (PPU), a Digital Signal Processor (DSP), a Field Programmable Gate Array (FPGA), a Programmable Logical Circuit (PLD), a controller, a microcontroller unit, a Reduced Instruction Set Computer (RISC), a microprocessor, etc. or any combination of the above.

In some embodiments, the application scenario may further include a storage device 140. The storage device 140 may be configured to store data and/or instructions. The storage device 140 may include one or more storage components. Each storage component may be an independent device, or may also be a part of other devices. In some embodiments, the storage device 140 may include a Random Access Memory (RAM), a Read-Only Memory (ROM), a large capacity memory, a removable memory, a volatile read/write memory, etc., or any combination thereof. Exemplarily, the large capacity memory may include a magnetic disc, a compact disc, a solid-state disc, etc. In some embodiments, the storage device 140 may be implemented on a cloud platform.

In some embodiments, one or more components of the online interview system 100 may transmit data to other components of the online interview system 100 through the network 120. For example, the processor 150 may acquire the information and/or data in the interviewed terminal 130 and the storage device 140 through the network 120, or send the information and/or data in the interviewing terminal 110, the interviewed terminal 130, and the storage device 140 through the network 120.

In some embodiments, the online interview system 100 supports selective communication of one terminal or among a plurality of terminals. The communication content may be selected to be fully disclosed, fully confidential, partially disclosed, disclosed for specific objects, etc. For example, the interviewed terminal 130 may support communication with one or more specific interviewing terminals, and the communication content may be visible to part or all of the users of the interviewed terminal 130.

In some embodiments, the online interview system 100 may perform data interaction through specific applications or relying on other applications and platforms. For example, communication data of the online interview system 100 may be cloud stored on the network 120 to realize quick transmission and export. For example, during an interview or after the interview is ended, a user may choose to save, share, send, and export identified text information.

In some embodiments, in a system taking a server as an executive subject, the online interview system 100 may include a communication connection establishment module and an information acquisition module. The previously described modules are all executed in a computing system introduced in an application scenario. Each module includes respective instructions. The instructions may be stored on a storage medium, and the instructions may be executed in a processor. Different modules may be located on the same device, or may be located on different devices. Data may be transmitted among the modules through program interfaces, networks, etc.

An interviewing terminal module is configured to acquire communication information of an interviewer.

An interviewed terminal is configured to acquire communication information of an interviewee.

The communication connection establishment module is configured to establish communication connection between the interviewing terminal and the interviewed terminal through a network.

The information acquisition module is configured to acquire the communication information between the interviewing terminal and the interviewed terminal. The communication information includes one or more types of audio information, video information, and text information.

In some embodiments, the interviewing terminal includes one or more of a first host terminal, a second host terminal, and a text processing terminal. The first host terminal is configured to host an interview, and the first host terminal displays an interview outline and/or information of the interviewed terminal. The second host terminal is configured to host the interview and/or participate in the consultation of interview questions. The text processing terminal converts the audio information and/or the audio information in the video into corresponding text information based on a machine learning model.

In some embodiments, if the interviewing terminal includes the text processing terminal. The method further includes a viewpoint information determination module, configured to determine, based on the communication information of the interviewed terminal and the text processing terminal, corresponding text information, perform text processing on the text information, and determine viewpoint information corresponding to the communication information of the interviewed terminal based on a viewpoint extraction rule and the one or more pieces of word segmentation information. The text processing includes that the text information is split into one or more pieces of word segmentation information.

In some embodiments, the viewpoint information determination module may further be configured to determine a viewpoint statistical result of a plurality of communication subjects based on the viewpoint information.

In some embodiments, the method further includes an emotion classification module, configured to determine emotion classifications corresponding to the communication information of the interviewed terminal through an emotion determination model based on the communication information of the interviewed terminal.

In some embodiments, the method may further include an opinion leader determination module, configured to determine opinion leader information in the communication information of the interviewed terminal according to one or more types of speaking frequency, speaking duration and number of interruptions in the communication information of the interviewed terminal.

In some embodiments, if the interviewing terminal further includes the first host terminal, the method further includes a viewpoint information output module, configured to output the viewpoint information on the first host terminal.

In some embodiments, if the interviewing terminal further includes the first host terminal and a second host terminal, the method further includes an outline updating module, configured to make the first host terminal ask questions based on an interview outline displayed on the first host terminal, and make the second host terminal update the interview outline based on the communication information of the interviewed terminal.

It should be understood that the system and modules thereof shown in one or more embodiments of the present specification may be implemented in various manners. For example, in some embodiments, the system and the modules thereof may be implemented by hardware, software, or a combination of software and hardware. The hardware part may be implemented by a special logic. The software part may be stored in a memory and executed by a proper instruction execution system such as a microprocessor or dedicated design hardware. Those skilled in the art can understand that the previously described method and system may be implemented by using a computer-executable instruction and/or including in a processor control code. Such a code is provided in, for example, a carrier medium like a magnetic disk, a Compact Disc (CD), or a Digital Video Disk-Read Only Memory (DVD-ROM), a programmable memory like a read-only memory (firmware), or a data carrier like an optical or electronic signal carrier. The system and modules thereof in the present application may be implemented by a hardware circuit, for example, a very-large-scale integrated circuit or gate array, a semiconductor like a logic chip, a transistor, etc., or a programmable hardware device like a field-programmable gate array, a programmable logic device, etc., or may be implemented by, for example, various types of software executed by a processor, or may be implemented by a combination (for example, firmware) of the hardware circuit and the software.

It is to be noted that the above description about a candidate option display and determination system and modules thereof is only for ease of description and may not limit the present application to the scope of the listed embodiments. It can be understood that those skilled in the art, after understanding the principle of the system, may freely combine each module or form subsystems for connection with the other modules without departing from the principle.

FIG. 2 is an exemplary flowchart of an online interview method 200 shown according to some embodiments of the present application.

At Step 210, communication connection between an interviewing terminal and an interviewed terminal is established. Specifically, the step may be executed by a communication connection establishment module.

In some embodiments, the interviewed terminal may be a terminal used by personnel of an interviewed side.

The interviewing terminal may be a terminal used by personnel of an interview side.

More descriptions of the interviewed terminal and the interviewing terminal may refer to the contents of the FIG. 1 of the present specification.

In some embodiments, communication connection may be established between the interviewing terminal and the interviewed terminal through a network, so as to perform interview or have a conference. In some embodiments, whether communication connection between the interviewing terminal and the interviewed terminal is established is determined according to a communication state. If the communication state is good, then it means that connection between the interviewing terminal and the interviewed terminal is established. If the communication state is interrupted, then it means that the connection between the interviewing terminal and the interviewed terminal is not established. In some embodiments, the communication state may be determined based on packet loss rate and waiting time. The packet loss rate refers to the rate of the number of lost data packets during a test to the transmitted data packets, and the waiting threshold is the longest time for feedback. In some embodiments, the communication state between the interviewing terminal and the interviewed terminal may be determined based on preset values of the packet loss rate and the waiting time. For example, when both the packet loss rate and the waiting time of a certain interviewing terminal are less than the preset values, then it may determined that the communication connection between the interviewing terminal and the interviewed terminal has been established. For another example, when the packet loss rate/the waiting time of a certain interviewing terminal is greater than a preset value, then it is determined that the communication connection between the interviewing terminal and the interviewed terminal is not established.

In some embodiments, after the communication connection is established, the communication information may be transmitted between the interviewing terminal and the interviewed terminal based on the communication connection. The communication information includes one or more types of audio information, video information, and text information. Further, the interviewing terminal and the interviewed terminal may perform interview or have a conference based on the transmitted communication information. In some embodiments, the communication connection between the interviewing terminal and the interviewed terminal may be established through a network or a telephone network configured to transmit data, and other networks that can transmit information. The communication connection may be established through the network, and the description of the network may refer to the contents of FIG. 1 of the present specification.

In some embodiments, the interviewing terminal and the interviewed terminal may be connected in a peer to peer communication manner. The peer to peer communication refers to that the interviewing terminal is directly connected to the interviewed terminal without switching through other devices or systems. For example, both the interviewing terminal and the interviewed terminal are computers. The two computers are directly interconnected through a network cable.

In some embodiments, the interviewing terminal and the interviewed terminal may realize communication connection through the switching of a server, so as to avoid non-fluent communication caused by the network when the interviewing terminal is in peer to peer communication with the interviewed terminal. For example, the communication connection may be established through third party communication software or platform through WeChat, QQ, Skype, etc. In some embodiments, one of the interviewing terminal and the interviewed terminal may be responsible for forwarding the communication information.

In some embodiments, the communication information between the interviewing terminal and the interviewed terminal may be the information produced during interviewing. In some embodiments, the communication information between the interviewing terminal and the interviewed terminal may include one or more types of audio information, video information, and text information. At Step 220, the communication information between the interviewing terminal and the interviewed terminal is acquired. Specifically, the step may be executed by the information acquisition module.

In some embodiments, the processor 150 may acquire the communication information between the interviewing terminal and the interviewed terminal. In an embodiment of the present scenario, the processor 150 may perform a plurality of types of processing, such as emotion determination and viewpoint extraction, based on the acquired communication information. The descriptions of the emotion determination and the viewpoint extraction may refer to the contents of FIG. 3 of the present specification, which is not described in detail herein. In some embodiments, the interviewing terminal may include at least one of a first host terminal, a second host terminal, and a text processing terminal, and execute related contents in Step 230.

In some embodiments, the interviewing terminal may include a first host terminal. When the interviewing terminal includes the first host terminal, the interviewing terminal may execute Step 231. The first host terminal may be configured to host an interview. For example, the first host terminal may be used as a terminal device used by a conference host to ask questions to the interviewed terminals. In some embodiments, an interview outline may be displayed on the first host terminal, and questions may be asked on the first host terminal based on the interview outline.

In some embodiments, the interviewing terminal may include a second host terminal. When the interviewing terminal includes the second host terminal, the interviewing terminal may execute Step 232, so that the second host terminal may participate in the co-host of the conference and/or the consultation of interview questions. For example, the second host terminal may be used by other interviewers to interview the interviewed terminal. For another example, the second host terminal may deeply mine related problems based on current questions.

In some embodiments, the interviewing terminal may include a first host terminal and a second host terminal. The first host terminal may display the information of the interviewed terminal, so as to determine the identity information of an interviewee or a participant. The second host terminal may be configured to assist the first host terminal to have the conference. For example, the second host terminal may assist the first host terminal to update the interview outlet based on the questions input artificially. For another example, when the first host terminal cannot continue the interview, the second host terminal may also ask supplementary questions based on the questions asked by the first host terminal to ensure the continuation of the interview.

In an embodiment of the present scenario, the first host terminal may ask questions based on the interview outline displayed on the first host terminal. The interview outline may refer to an outline of the content discussed or interviewed according to an established conference. For example, the interview outline may include interview question content, such as age, gender, occupation, native place, home address, hobbies, product customer satisfaction, etc. For example, the interview outline may include the content related to conference discussion, such as conference theme, conference items, etc. In some embodiments, the interview outline may be set in advance, for example, set in the first host terminal for displaying or voice broadcasting. In some embodiments, the interview outline may also be updated automatically by the second host terminal based on the communication information of the interviewed terminal. For example, when it is determined that the communication subject is a female according to the communication information of the interviewed terminal, the interview outline may update corresponding interview content to feminine content (such as interview content related to cosmetics). In some alternative embodiments, the interview outline may also be updated content of the second host terminal based on manual input, and the interview content is artificially determined to update.

In some embodiments, when the first host terminal has an abnormal state, such as a communication connection terminal, the second host terminal can continue to ask questions based on the current interview process to ensure the continuation of the interview.

In some embodiments, the interviewing terminal further may include a text processing terminal. When the interviewing terminal includes the text processing terminal, the interviewing terminal may execute Step 233 to convert audio information and/or the audio information in a video into corresponding text information. Specifically, the operation of converting the audio information into corresponding text information may be realized based on a voice recognition technology. For example, the content in the audio information is recognized by a voice recognition model or an acoustic model that is trained in advance. In some embodiments, the text processing terminal may record obtained text information as an interview/conference process in a text manner to form a conference summary, and send the formed conference summary to a storage device 140 for storing.

In some embodiments, the interviewing terminal may further include a text processing terminal, a first host terminal and/or a second host terminal. In an embodiment of the present scenario, the text processing terminal may send the text information converted during interview to a processor 150, and the processor 150 may extract corresponding viewpoint information based on the text information.

In some alternative embodiments, the step of extracting the corresponding viewpoint information based on the text information may further be completed by the text processing terminal. Detailed description related to extracting the corresponding viewpoint information based on the text information may refer to corresponding description of FIG. 3, which is not described in detail herein.

In the previously described one or more embodiments involving the text processing terminal, the extracted viewpoint information may be sent to the first host terminal and/or the second host terminal.

In some embodiments, an opinion leader determination module may determine an opinion leader in the communication information of the interviewed terminal according to one or more types of speaking frequency, speaking duration and number of interruptions in the communication information of the interviewed terminal.

The opinion leader refers to an interviewee who plays a guiding role in the communication information of the interviewed terminal. The opinion leader determination module may determine the opinion leader according to one or more of the following features: one or more types of the speaking frequency, the speaking duration and the number of interruptions in the communication information of the interviewed terminal. The used determination rule may be set in advance, or may also be set by acquiring user input or other manners.

In some embodiments, the opinion leader may also be determined by setting corresponding determination threshold values. The determination threshold values include, but are not limited to, a threshold value of the speaking frequency, a threshold value of the speaking duration, and a threshold value of the number of interruptions, etc.

In some embodiments, a threshold value of the speaking frequency may be preset (for example, speaking three times per minute). When the speaking frequency of a certain interviewee reaches or exceeds the threshold value, the interviewee may be determined to be an opinion leader. In some embodiments, a threshold value of the speaking duration may also be preset (for example, a single continuous speaking duration is 5 minutes or the cumulative speaking duration within 10 minutes is 5 minutes). When the speaking time of a certain interviewee reaches or exceeds the threshold value, the interviewee may be determined to be an opinion leader. In some embodiments, a threshold value of the number of interruptions of a speech may also be preset (for example, the speech is interrupted 5 times within 10 minutes). When the number of interruptions of a certain interviewee reaches or exceeds the threshold value, the interviewee may be determined not to be an opinion leader.

In some embodiments, whether a certain interviewee is an opinion leader may also be determined by comprehensively using one or more manners of the speaking frequency, the speaking duration and the number of interruptions. In some embodiments, whether a certain interviewee is an opinion leader may also be jointly determined by using two manners of the speaking duration and the number of interruptions. Specifically, in some embodiments, a threshold value of the speaking duration may be preset that "the cumulative speaking duration is 5 minutes within 10 minutes", and meanwhile, a threshold value of the number of interruptions of a speech may be preset that "the speech is interrupted 5 times within 10 minutes". In an embodiment of the present scenario, an interviewee may be determined to be an opinion leader only when the two conditions that "the cumulative speaking duration is 5 minutes within 10 minutes" and the "the speech is interrupted 5 times within 10 minutes" are satisfied at the same time For example, the cumulative speaking duration of a certain interviewee reaches 6 minutes within 10 minutes, but the speech is interrupted 6 times within 10 minutes, then the interviewee may be determined not to be an opinion leader. In the previously described threshold value setting manner, the interviewees who have a long cumulative speaking duration but have been interrupted more times may be excluded, so as to avoid determining them as opinion leaders.

The opinion leader may be sent to the first host terminal and/or the second host terminal after being determined by the processor. In some alternative embodiments, an opinion leader may also be marked artificially by the first host terminal and/or the second host terminal according to the content, such as speech information, of the interviewee.

In some embodiments, the opinion leader may be determined by an opinion leader determination model. The opinion leader determination model is configured to analyze one or more types of the speaking frequency, the speaking duration, and the number of interruptions of a plurality of interviewees, and predict to obtain an opinion leader in the plurality of interviewees.

In some embodiments, information, such as the speaking frequency, speaking duration, and number of interruptions, of a plurality of interviewees is input into an opinion leader determination model. The opinion leader determination model may perform processing and calculation on the information, such as the speaking frequency, the speaking duration, and the number of interruptions, of the plurality of interviewees, and output the probability of each interviewee becoming an opinion leader. For example, the opinion leader determination model may perform weighted summation calculation on the speaking frequency, speaking duration, and number of interruptions, of a plurality of interviewees to obtain the probability of each interviewee becoming an opinion leader.

In some embodiments, the interviewee with the highest probability value of becoming an opinion leader is called an opinion leader.

In some embodiments, threshold value determination may also be performed on the probability value of becoming an opinion leader. For example, when the probability value of an interviewee becoming an opinion leader is higher than a threshold value, the interviewee may be called an opinion leader.

In some embodiments, the opinion leader determination model may be obtained by training on the basis of a plurality of training samples with labels. In some embodiments, a group of training samples may include: the speaking frequency, speaking duration, and number of interruptions of a plurality of interviewees, and sample labels. In some embodiments, the sample labels may be that "the interviewee is an opinion leader" or "the interviewee is not an opinion leader", which may be respectively represented as 1 or 0.

In some embodiments, the opinion leader determination model may be trained to update model parameters by a conventional method based on the previously described samples. For example, the opinion leader determination model may be trained based on a gradient descent method.

In some embodiments, when the trained opinion leader determination model satisfies a preset condition, the training is ended. The preset condition may be that a loss function result converges, is less than a preset threshold value, or the like.

It is worthwhile to note that the previously described division of interviewing terminals is only to clearly explain the role of each terminal device in the interview. In some embodiments, the interviewing terminal may be a single device or apparatus, and may also be a plurality of devices or apparatuses. For example, the first host terminal, the second host terminal, and the text processing terminal are implemented on one device or apparatus (for example, a computer) together.

Figure 3:
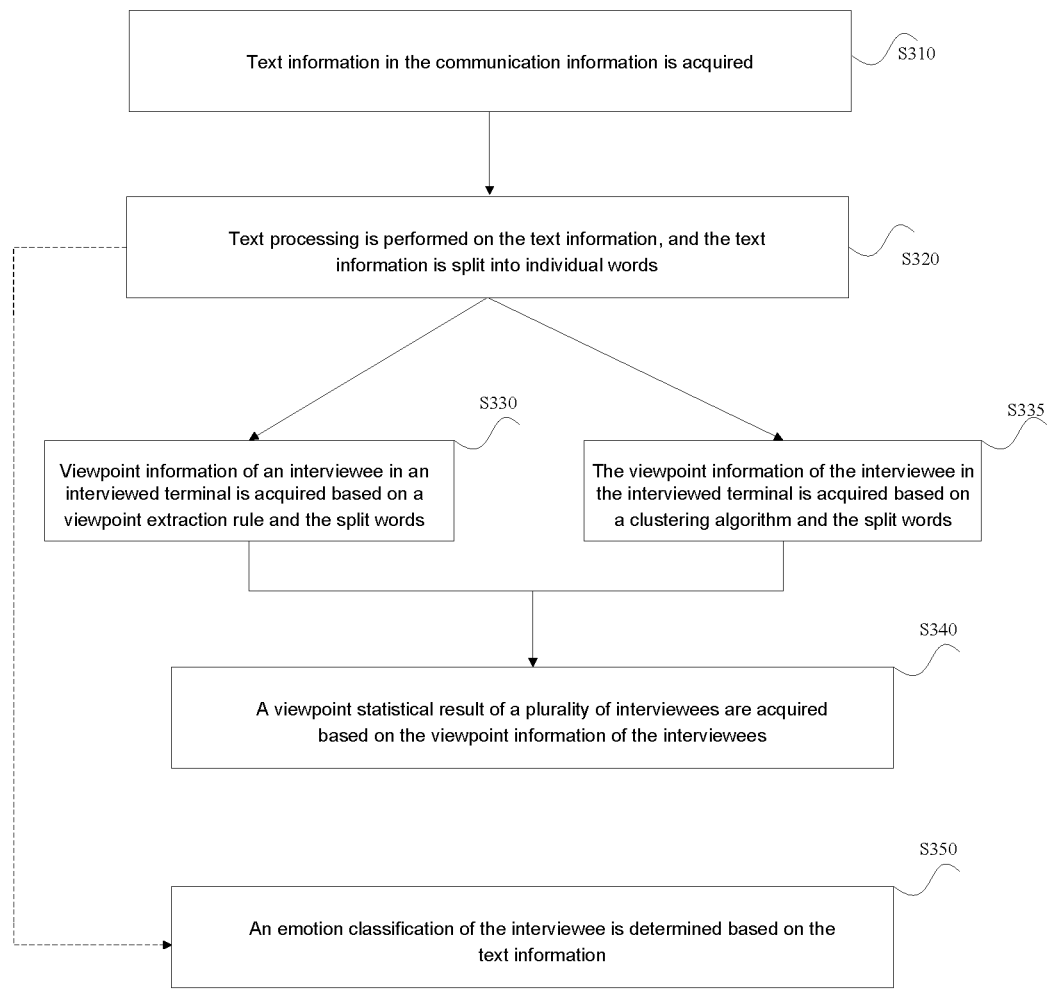
FIG. 3 is an exemplary flowchart of a viewpoint information extraction method shown according to some embodiments of the present application.

In some embodiments, the viewpoint information determination module may extract viewpoint information based on the communication information of the interviewed terminal. In some alternative embodiments, the interviewing terminal may further include a text processing terminal. In an embodiment of the present scenario, the text processing terminal may extract viewpoint information based on the communication information of the interviewed terminal. FIG. 3 is an exemplary flowchart of extracting viewpoint information 300 based on communication information of an interviewed terminal shown according to some embodiments of the present application.

At Step 310, corresponding text information is determined on the basis of the communication information of the interviewed terminal and the text processing terminal.

In some embodiments, the text information may include the text information in the communication information and/or the text information processed by the text processing terminal. For example, the text information may be the text information in the communication information between interviewees. For another example, the text information may also be the text information converted by processing an interview view/audio by the text processing terminal.

At Step 320, text processing is performed on the text information to split the text information into individual words.

In some embodiments, text processing may be performed on the text information to split the text information into individual words. In some embodiments, a process of splitting the text information may also called performing word segmentation processing on the text information.

In some embodiments, the word segmentation processing may also be performed on the basis of a preset algorithm. In some embodiments, the preset algorithm may also include a specific word segmentation model. Word segmentation processing methods include, but are not limited to: a string matching-based word segmentation method, an understanding-based word segmentation method, a statistics-based word segmentation method, etc. In some embodiments, word segmentation processing may be performed on the text information through word segmentation models. The word segmentation models include, but are not limited to: an N-ary Grammar Model (N-gram), a Hidden Markov Model (HMM), a Maximum Entropy Model (ME), a Conditional Random Fields Model (CRF), a JIEBA word segmentation model, etc.

In some embodiments, after the text information is split into individual words in Step 320, viewpoint information of an interviewee may also be obtained based on the words obtained by splitting. In some embodiments, viewpoint information of the interviewee may be extracted based on a viewpoint extraction rule, which may specifically refer to Step 330. In some embodiments, viewpoint information of the interviewee may further be extracted based on a clustering algorithm, which may specifically refer to Step 335.

At Step 330, the viewpoint information corresponding to the communication information of the interviewed terminal is determined based on a viewpoint extraction rule and the one or more pieces of word segmentation information.

In some embodiments, the viewpoint information of the interviewee corresponding to the communication information of the interviewed terminal may be determined through the one or more pieces of word segmentation information obtained in Step 320. Specifically, the segmentation word information may be processed based on the viewpoint extraction rule to obtain the viewpoint information of the corresponding interviewee. In some embodiments, the viewpoint extraction rule may be set through a key word and a syntactic structure.

The key word refers to one or more words that can reflect the viewpoint of an interviewee. In some embodiments, the key word may be acquired based on different classifications in a historical question bank. For example, all of different classifications (such as, consumption, sports, military, and culture) in the historical question bank have different key words. In some embodiments, the key words of different classifications may be set artificially. For example, questions in the historical question bank may be labeled artificially, and the key words in historical questions may be obtained based on the manners of regular matching and the like. In some embodiments, different classifications in the historical question bank may also be obtained by extracting key words of a plurality of sentences in a clustering center after clustering algorithm processing is performed based on word vectors and sentence vectors in sentences, and the processing related to the clustering algorithm and the word vectors may refer to corresponding description of Step 335, which is not described in detail herein.

In some embodiments, viewpoint information of the interviewee may be extracted in combination with a syntactic structure after the key word is obtained. The syntactic structure refers to a grammatical structure in a sentence. The syntactic structure includes, but is not limited to a Subject-Verb Structure (SBV), an Attributive Structure (ATT), and Adverbial Structure (ADV), etc. In some embodiments, viewpoint information of the interviewee may be extracted based on a key word and a syntactic structure. Specifically, after the key word is determined, a word related to the key word may be obtained by setting a syntactic structure, and the viewpoint information of the interviewee is obtained.

Taking the classification of "consumption" as an example, the classification of "consumption" can include but is not limited to keywords, such as "price", "packaging", "quality", etc. In a specific interview scenario, when the question asked by an interviewer is "why did you choose to buy this product?", the classification of the question asked by the interviewer is "consumption". At this time, the answer of the interviewee is: "I think the packaging of this product is very exquisite and the price is very affordable", and then key words "packaging" and "price" are set as subjects based on the Subject-Verb Structure (SBV). The predicates corresponding to the above subjects are "exquisite" and "affordable" are extracted from the sentences of the answers, and finally, the words, "exquisite packaging" and "affordable prices", obtained based on the previously described method are identified as the viewpoint information of the interviewee.

At Step 335, the viewpoint information corresponding to the communication information of the interviewed terminal is determined based on the clustering algorithm and the one or more pieces of word segmentation information.

In some embodiments, the viewpoint information corresponding to the communication information of an interviewee may also be acquired by using a clustering algorithm. The clustering algorithm includes but is not limited to K-Means algorithm, DBSCAN algorithm, BIRCH algorithm, MeanShift algorithm, etc. Specifically, sentence vectors of various sentence in the text information of the communication information are obtained. Clustering is performed based on the sentence vectors. A "representative" sentence is extracted from a clustering center of sentence clustering, a viewpoint is generated for the sentence, and the viewpoint is used to represent the viewpoint of the clustering.

In some embodiments, the word vectors of corresponding words may be obtained based on the word segmentation processing performed in Step 320. In some alternative embodiments, the word vectors of various words may be obtained based on a Word Embedding model, a BiLSTM model, a Word2vec model, etc.

In some embodiments, a sentence vector of a corresponding sentence may be obtained based on the word vectors of the words in the sentence. For example, the sentence vector may be obtained by splicing based on the word vectors of various words in the sentence. For another example, the sentence vector may be obtained by weighted summation of the word vectors of various words in the sentence. In some embodiments, the sentence vector may be obtained based on a BERT model.

In some embodiments, whether the sentence vector belongs to the clustering center may be determined by determining the distance between the sentence vector and the clustering center. In some embodiments, the distance may include but is not limited to cosine distance, Euclidean distance, Manhattan distance, Mahalanbis distance, Minkowski distance, etc. Specifically, a vector distance between the sentence vector and the clustering center may be determined by setting a threshold value. For example, when the vector distance between the sentence vector and the clustering center is less than the threshold value, then the feature may be determined to belong to the clustering. Otherwise, the feature does not belong to the clustering.

In some embodiments, whether the sentence vector belongs to a certain clustering center may also be determined through a vector similarity coefficient. Specifically, the vector similarity coefficient may be determined by setting a threshold value. For example, when the vector similarity coefficient between the sentence vector and the clustering center is higher than the threshold value, then the feature may be determined to belong to the clustering. Otherwise, the feature does not belong to the clustering.

At Step 340, a viewpoint statistical result of a plurality of interviewees is acquired based on the viewpoint information of the interviewees.

In some embodiments, a viewpoint statistical result of a plurality of communication subjects may be acquired based on the acquired viewpoint information. In some embodiments, the communication subjects may include interviewees using the interviewed terminal. In some embodiments, the viewpoint statistical result may reflect an overall result of a plurality of interviewee on a certain question. For example, for a certain question, how many interviewees agree and how many interviewees disagree. In some embodiments, the overall viewpoint of a certain interviewee on a certain classification of questions may be determined based on the viewpoint statistical result of the viewpoint information of a plurality of questions of the interviewee. For example, if an interviewee disagrees a plurality of questions about "consumption", then it may determine that the overall viewpoint of the interviewee about "consumption" is disagree.

It is noted that those skilled in the art may make reasonable changes on the method of the present specification. For example, the viewpoint statistical result may have a variety of manifestation forms. For example, the viewpoint statistical result may be represented in the manners of a line chart, a pie chart, a bar chart, a Gantt chart, etc. For example, how many people agree with or disagree with a topic may be displayed in real time. Such changes are still within the scope of protection of the present specification.

In some embodiments, if the interviewing terminal further includes the first host terminal, the viewpoint information of the interviewee may also be displayed on the first host terminal after the viewpoint information of the interviewee is acquired. Specifically, the viewpoint information of the interviewee may be output on the first host terminal based on a viewpoint information output module.

In some alternative embodiments, the first host terminal may also display the viewpoint statistical result. In some embodiments, the first host terminal may ask more targeted questions based on the viewpoint information of the interviewee and/or the viewpoint statistical result.

In some embodiments, Step 350 may also be executed based on individual words obtained by text processing in Step 320. At step 350, an emotion classification of an interviewee is determined based on the text information.

In some embodiments, a certain sentence/all constituent words in a certain paragraph spoken by the interviewee may be input into an emotion determination model, and an emotion classification of the interviewee may be output based on the emotion determination model. In some embodiments, the emotion classifications may be positive emotion, negative emotion, neutral emotion, etc.

In some embodiments, the emotion determination model may store a word bank, and all stored words may be classified in the word bank in advance. For example, the stored words may be classified into positive emotion words, negative emotion words, neutral words, etc. The emotion determination model may determine the emotion classification of the interviewee based on the classifications of the communication information of the interviewed terminal in the word bank. Specifically, the numbers of occurrences of the positive emotion words, negative emotion words, neutral words, etc. spoken by the interviewee may be counted, so as to output an emotion classification of the interviewee. For example, if there are 12 positive emotion words and 0 negative emotion word in a paragraph spoken by the interviewee A, then the emotion classification of the interviewee is a positive emotion.

In some embodiments, the word bank may also include the word vectors of all words stored therein. In some embodiments, the word vectors in the word bank may be clustered based on a clustering algorithm. In some embodiments, the word vectors in the word bank may be clustered correspondingly according to the emotion classification of the interviewee that needs to be output. For example, when the emotion classification of the interviewee is a positive emotion, a negative emotion, or a neutral emotion, the word vector clustering center in the word bank may be correspondingly set as a positive word vector, a negative word vector, and a neutral word vector. In some embodiments, the emotion classification of the interviewee may be acquired by counting the frequency of the positive word vector, the negative word vector, and the neutral word vector in the words of the interviewee.

In some embodiments, when there is a new word in the communication information of the interviewed terminal, the culturing to which the word belongs may be determined based on the word vector corresponding to the word, so as to determine the emotion classification of the interviewee of the interviewed terminal.

It is noted that the emotion classifications of the interviewee may be diversified. For example, the emotion classifications of the interviewee may be anger, joy, indifference, disgust, etc. For another example, the emotion classifications of the interviewee may be classified into certain levels. For example, the emotion classification of disgust may be classified into disgust level 1, disgust level 2, disgust level 3, etc. Similar changes are still within the scope of protection of the present application.

The embodiments of the present application may have, but not limited to, the following beneficial effects. (1) In an interviewing process, the viewpoints of an interviewee are determined in real time and represented intuitively based on the communication information (video, audio, text, etc.), so that the interview is more effective. (2) After the interview is ended, interview transcripts are exported in real time, which saves labor cost and improves the completeness and accuracy of the interview transcripts. (3) The viewpoint statistical result and the opinion leader of the interviewee are displayed during interviewing, so that the interview is more targeted, and the interview process is more efficient. It is to be noted that different beneficial effects may be achieved in different embodiments. The beneficial effects achievable in different embodiments may be any one or combination of the above, or may be any other achievable beneficial effects.

The basic concepts have been described above. It is apparent to those skilled in the art that the above detailed disclosures are merely examples and not intended to limit the present application. Those skilled in the art may make various modifications, improvements, and corrections to the present application, even though not specified herein. Such modifications, improvements, and corrections are suggested in the present application, and thus still fall within the spirit and scope of the exemplary embodiments of the present application.

In addition, specific terms are used in the present application to describe the embodiments of the present application. For example, "an embodiment", "one embodiment", and/or "some embodiments" mean/means a certain feature, structure, or characteristic related to at least one embodiment of the present application. Therefore, it is to be emphasized and noted that "one embodiment", or "an embodiment", or "an alternative embodiment" mentioned twice or for many times at different positions in the specification does not always refer to the same embodiment. In addition, some features, structures, or characteristics in one or more embodiments of the present application may be combined as appropriate.

In addition, those skilled in the art can understand that each aspect of the present application may be explained and described with a plurality of patentable sorts or conditions, including combinations of any new or useful procedures, machines, products, or substance, or any new and useful improvements thereof. Correspondingly, each aspect of the present application may be executed completely by hardware, executed completely by software (including firmware, resident software, microcodes, etc.), or executed by a combination of the hardware and the software. The hardware or software may be called a "data block", "module", "engine", "unit", "component", or "system". In addition, each aspect of the present application may be represented as a computer product in one or more computer-readable media, and the product includes a computer-readable program code.

The computer storage medium may include a propagated data signal with a computer program code therein, for example, on a baseband or as a part of a carrier. The propagated signal may be represented in many forms, including an electromagnetic form, an optical form, the like, or a proper combination form. The computer storage medium may be any computer-readable medium except a computer-readable storage medium, and the medium is connected to at least one instruction execution system, apparatus, or device to implement a program for communication, propagation, or transmission. The program code in the computer storage medium may be propagated through any suitable medium, including radio, a cable, an optical fiber, a Radio Frequency (RF), a similar medium, or any combination of the media.

The computer program code required by the operation of each part of the present application may be written by any one or more programming languages, including an object-oriented programming language such as Java, Scala, Smalltalk, Eiffel, JADE, Emerald, C++, C #, VB.NET, and Python, a conventional procedural programming language such as C language, Visual Basic, Fortran2003, Perl, COBOL2002, PHP, and ABAP, a dynamic programming language such as Python, Ruby, and Groovy, another programming language, etc. The program code may run completely in a user computer, or run in the user computer as an independent software package, or partially run in the user computer and partially run in a remote computer, or run completely in the remote computer or a server. Under the latter condition, the remote computer may be connected with the user computer through any network form such as a Local Area Network (LAN) or a Wide Area Network (WAN), or connected to an external computer (for example, through the Internet), or in a cloud computing environment, or used as service such as Software as a Service (SaaS).

In addition, unless specified in the claims, the order of the processing elements and sequence, use of numerals and letters, or use of other names in the present application is not intended to limit the orders of the flows and methods of the present application. Although some invention embodiments that seem useful at present are discussed through various examples in the above disclosure, it should be understood that such details only achieve a purpose of description, and the appended claims are not limited to the disclosed embodiments and intended to cover all corrections and equivalent combinations consistent with the essence and scope of the embodiments of the present application instead. For example, the system component described above may be implemented through a hardware device, but may also be implemented only through a software solution. For example, the described system is installed in an existing server or mobile device.

Similarly, it should be noted that, for simplifying the expressions disclosed in the present application to help to understand one or more invention embodiments, multiple features may sometimes be incorporated into one embodiment, drawing, or the description thereof in the above description about the embodiments of the present application. However, such a disclosure method does not mean that an object of the present application needs more features than those mentioned in the claims. In practice, the features of the embodiment are fewer than all features of a single embodiment disclosed above.

Numerals describing the numbers of components and attributes are used in some embodiments. It should be understood that such numerals for describing the embodiments are modified with modifiers "about", "approximately", or "substantially" in some examples. Unless otherwise specified, "about", "approximately", or "substantially" represents that the numeral allows a change of ±20%. Correspondingly, in some embodiments, numerical parameters used in the specification and the claims are all approximate values, and the approximate values may change according to characteristics required by individual embodiments. In some embodiments, the numerical parameter should consider specified valid digits and adopt a general digit retention method. Although numerical ranges and parameters, in some embodiments of the present application, used to confirm the breadths of scopes thereof are approximate values, such numerical values are set as accurately as possible in a possible scope in specific embodiments.

The entire contents of each patent, patent application, patent application disclosure, and other materials such as articles, books, specifications, publications, and documents, cited in the present application are incorporated in the present application by reference, except historical application files inconsistent or conflicting with the contents of the present application as well as files (appended to the present application at present or latter) limiting the broadest scope of the claims of the present application. It is to be noted that the description, definition, and/or use of terms in the present application are/is taken as final if the description, definition, and/or use of terms in the materials appended to the present application are/is inconsistent or conflict/conflicts with the contents as described in the present application.

It should finally be understood that the embodiments in the present application are only used to explain the principle of the embodiments of the present application, and other transformations may also fall within the scope of the present application. Therefore, as an example rather than restriction, alternative configuration of the embodiment of the present application may be considered consistent with the teaching of the present application. Correspondingly, the embodiments of the present application are not limited to the embodiments clearly introduced and described in the present application.

What is claimed is:

1. An online interview method, comprising:
    establishing communication connection between an interviewing terminal and an interviewed terminal through a network;
    acquiring communication information between the interviewing terminal and the interviewed terminal, wherein the communication information comprises one or more types of audio information, video information, and text information;
    the interviewing terminal comprises one or more of a first host terminal, a second host terminal, and a text processing terminal,
    wherein the first host terminal is configured to host an interview, and the first host terminal displays an interview outline and/or information of the interviewed terminal;
    the second host terminal is configured to host the interview and/or participate in the consultation of interview questions; and
    the text processing terminal converts the audio information and/or the audio information in the video into corresponding text information based on a machine learning model,
    the method further comprises: determining opinion leader information in the communication information of the interviewed terminal according to one or more types of speaking frequency, speaking duration and number of interruptions in the communication information of the interviewed terminal,
    wherein the determining the opinion leader information in the communication information of the interviewed terminal comprises:
    comparing the speaking frequency, speaking duration and number of interruptions of each interviewee in all communication information with preset threshold values of the speaking frequency, speaking duration and number of interruptions; and
    determining the interviewee with a comparison result satisfying a threshold value condition as an opinion leader.

2. The method as claimed in claim 1, wherein if the interviewing terminal comprises the text processing terminal, the method further comprises:
    determining, based on communication information of the interviewed terminal and the text processing terminal, corresponding text information;
    performing text processing on the text information, wherein the text processing comprises splitting the text information into one or more pieces of word segmentation information; and
    determining viewpoint information corresponding to the communication information of the interviewed terminal based on a viewpoint extraction rule and the one or more pieces of word segmentation information.

3. The method as claimed in claim 2, wherein the communication information of the interviewed terminal comprises a plurality of communication subjects, the method further comprises:
    determining a viewpoint statistical result of the plurality of communication subjects based on the viewpoint information.

4. The method as claimed in claim 1, further comprising:
    determining emotion classifications corresponding to the communication information of the interviewed terminal through an emotion determination model based on the communication information of the interviewed terminal.

5. The method as claimed in claim 2, wherein if the interviewing terminal further comprises the first host terminal, the method further comprises: outputting the viewpoint information on the first host terminal.

6. The method as claimed in claim 1, wherein if the interviewing terminal comprises the first host terminal and the second host terminal, the method further comprises:
    asking, by the first host terminal, questions based on the interview outline displayed on the first host terminal; and
    updating, by the second host terminal, the interview outline based on the communication information of the interviewed terminal.

7. The method as claimed in claim 1, further comprising:
    after determining that the communication connection between the interviewing terminal and the interviewed terminal is not established and/or is disconnected, controlling the any one or more of the first host terminal, the second host terminal, and the text processing terminal to display.

8. The method as claimed in claim 7, wherein the determining that the communication connection between the interviewing terminal and the interviewed terminal is not established and/or is disconnected comprises:
    acquiring packet loss rate of data transmission between the interviewing terminal and the interviewed terminal;
    when the packet loss rate is less than a preset value, controlling the data transmission between the interviewing terminal and the interviewed terminal; and
    when the packet loss rate is greater than a preset value, determining that the communication connection between the interviewing terminal and the interviewed terminal is not established and/or is disconnected.

9. The method as claimed in claim 1, wherein the determining the opinion leader information in the communication information of the interviewed terminal comprises:
    constructing an opinion leader determination model, and performing weighted summation calculation on the speaking frequency, speaking duration and number of interruptions based on the opinion leader determination model to acquire the probability of each interviewee becoming an opinion leader; and
    determining the interviewee with the highest probability and/or the probability higher than a preset value as the opinion leader.

10. The method as claimed in claim 2, further comprising:
    sending all text information of any interviewee to a preset emotion determination model, wherein the emotion determination model stores a word bank; and
    analyzing, by the emotion determination model, the text information, and matching the text information with a word in the word bank to determine the emotion of the interviewee.

11. The method as claimed in claim 10, wherein the matching the text information with a word in the word bank to determine the emotion of the interviewee comprises:
    counting the number of different classifications of emotions corresponding to the text information, wherein words in the word bank respectively have different classifications of emotions; and
    taking the emotion corresponding to the classification with the most number as the emotion of the interviewee.

12. An online interview system, comprising a communication connection establishment module and an information acquisition module:

the communication connection establishment module is configured to establish communication connection between an interviewing terminal and an interviewed terminal through a network;

and the information acquisition module is configured to acquire communication information between the interviewing terminal and the interviewed terminal, wherein the communication information comprises one or more types of audio information, video information, and text information;

the interviewing terminal comprises one or more of a first host terminal, a second host terminal, and a text processing terminal, wherein the first host terminal is configured to host an interview, and the first host terminal displays an interview outline and/or information of the interviewed terminal; the second host terminal is configured to host the interview and/or participate in the consultation of interview questions; and the text processing terminal converts the audio information and/or the audio information in the video into corresponding text information based on a machine learning model, the system further comprises an opinion leader determination module, wherein the opinion leader determination module is configured to execute the following steps:

determining opinion leader information in the communication information of the interviewed terminal according to one or more types of speaking frequency, speaking duration and number of interruptions in the communication information of the interviewed terminal, wherein the opinion leader determination module is further configured to execute the following steps:

comparing the speaking frequency, speaking duration and number of interruptions of each interviewee in all communication information with preset threshold values of the speaking frequency, speaking duration and number of interruptions; and determining the interviewee with a comparison result satisfying a threshold value condition as an opinion leader.

13. The system as claimed in claim 12, further comprising:

a viewpoint information determination module if the interviewing terminal comprises the text processing terminal, wherein the viewpoint information determination module executes the following steps:

determining, based on communication information of the interviewed terminal and the text processing terminal, corresponding text information;

performing text processing on the text information, wherein the text processing comprises splitting the text information into one or more pieces of word segmentation information; and determining viewpoint information corresponding to the communication information of the interviewed terminal based on a viewpoint extraction rule and the one or more pieces of word segmentation information.

14. The system as claimed in claim 13, wherein the viewpoint information determination module further executes the following steps:

determining a viewpoint statistical result of the plurality of communication subjects based on the viewpoint information.

15. A computer readable storage medium, wherein the computer readable storage medium stores computer instructions; and the method as claimed in claim 1 is implemented when the computer instructions are executed by the processor.

* * * * *